United States Patent [19]
Erwin

[11] Patent Number: 5,307,730
[45] Date of Patent: May 3, 1994

[54] PISTON RETURN SPRING SYSTEM WITH SELF-ADJUSTING CLEARANCE FEATURE

[75] Inventor: Robert D. Erwin, Brownsburg, Ind.

[73] Assignee: General Motors Corporation, Detroit, Mich.

[21] Appl. No.: 976,032

[22] Filed: Nov. 13, 1992

[51] Int. Cl.⁵ .................... F01B 31/00; F16D 55/22; F16F 1/18
[52] U.S. Cl. .................. 92/130 A; 92/130 B; 267/163; 188/72.3; 188/71.8
[58] Field of Search ............ 92/13.4, 130 R, 130 A, 92/130 B, 135; 188/72.3, 71.8; 267/163, 164, 154, 155

[56] References Cited

U.S. PATENT DOCUMENTS

| | | |
|---|---|---|
| 2,878,901 | 3/1959 | Runner ........................... 188/71.8 |
| 3,439,781 | 4/1969 | Ostwald ....................... 188/71.8 X |
| 3,575,268 | 4/1971 | Kimata ......................... 188/71.8 X |

FOREIGN PATENT DOCUMENTS

| | | | |
|---|---|---|---|
| 1136164 | 9/1962 | Fed. Rep. of Germany ..... | 188/71.8 |
| 1227387 | 10/1961 | France ............................ | 188/71.8 |
| 1550796 | 11/1968 | France ............................ | 188/71.8 |
| 46-28580 | 4/1966 | Japan ............................... | 188/71.8 |

Primary Examiner—Edward K. Look
Assistant Examiner—John Ryznic
Attorney, Agent, or Firm—Donald F. Scherer

[57] ABSTRACT

A return spring (40,60) operable with piston means (30) for use in fluid operated friction torque transmission devices (11) including relatively rotatable members (12,13) carrying a plurality of torque plates (18,22), one of the members providing a fluid chamber (34) in which the piston means is reciprocable. Such a spring comprises flexible base means (41,61) carried within a recess (50,51) provided in the rotatable member and spring tab means (43,66) extending from the flexible base means and engageable with a wall (52) of the piston means; the tab means being movable with the piston means upon movement thereof in and out of the chamber in response to activation of the piston means.

11 Claims, 4 Drawing Sheets

PISTON RETURN SPRING SYSTEM WITH SELF-ADJUSTING CLEARANCE FEATURE

TECHNICAL FIELD

The present invention relates generally to torque transmitting systems in the nature of either brakes or clutches. More particularly, the present invention relates to actuating piston assemblies for torque transmitting systems. Specifically, the present invention relates to a piston return spring for clutch and brake assemblies that is self-adjusting and provides a uniform clearance between the actuating piston and the torque plates.

BACKGROUND ART

Torque transmitting systems are widely employed in automobile transmissions to provide selective, relative rotation between components of the transmission. As is well known to the art, one widely accepted form of an automatic, vehicular transmission employs compound planetary gear sets that utilize three clutch assemblies and two braking bands to preclude relative rotation between selected components in order to obtain the desired function of the compound planetary gear sets. The operator selects the driving range from the neutral, forward (either the standard drive, the "Intermediate" or the "Lo" forward selections) or reverse, and the transmission automatically changes gear ratios in relation to the vehicle speed and the engine torque input, as permitted within the range selected. Vehicle speed and engine torque signals are constantly fed to the transmission in a manner well known to the art in order to provide the proper gear ratio for maximum efficiency and performance at all throttle openings.

A planetary gear train consists of a center, or sun, gear, an internal gear and a planetary carrier assembly which includes and supports the smaller planetary gears, or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear train rotate in the same direction and at the same speed, the third member is forced to turn at the same speed. For example, when the sun gear and the internal gear rotate in the same direction, and at the same speed, the planetary gears do not rotate about their own axes but rather act as wedges to lock the entire unit together to effect what is known as direct drive.

Whenever the carrier assembly is restrained from spinning freely, and power is applied to either the sun gear or the internal gear, the planetary gears act as idlers. In that way the driven member is rotated in the opposite direction as the drive member. Thus, when the reverse drive range is selected, a brake band assembly is actuated frictionally to engage the carrier assembly, and restrain it against rotation, so that torque applied to the sun gear will turn the internal gear in the opposite direction in order to reverse the rotational direction of the drive wheels, and thereby reverse the direction of the vehicle itself. The friction band assemblies are normally operated by servo mechanisms, many varieties of which are known to the art, but the present invention does not relate to servo mechanisms, and they will not be further described herein.

It should be appreciated that a second friction applying band assembly may also be employed when the engine compression, acting through the transmission, is being employed to effect a braking action. To understand this operation it is desirable to know that in a compound planetary gear set, multiple planetary gear sets may be employed, and adjacent planetary gear sets may utilize sun gears fabricated in one piece. A sprag assembly is frequently employed selectively to preclude the common sun gears from rotating in one direction.

Adjacent planetary gear sets also generally connect the carrier of the first set to the internal gear of the second set. To make the two planetary gear sets effective a roller clutch assembly is generally employed to hold the carrier of the second set against rotation in at least one direction.

To provide a means of connecting and disconnecting the power output from the converter to the transmission gear train, a clutch assembly is generally employed. Typically a clutch assembly includes a clutch housing which is splined to the input shaft. A series of torque plates are connected, as by tangs, to the clutch housing, and a second series of torque plates are connected, also by tangs, to a clutch hub member. An actuating piston is hydraulically operated frictionally to lock the torque plates together, and a release spring is employed to retract the piston when the hydraulic pressure is released. By effecting a spline connection between the main transmission shaft and the clutch hub member, whenever hydraulic pressure is supplied to the clutch assembly the input shaft directly rotates the main transmission shaft. When the hydraulic pressure is released, the clutch assembly disengages the aforesaid drive connection, and the transmission is in neutral.

A similar clutch arrangement may also be employed selectively to connect the outer race of the sprag to the transmission housing. When the outer race of the sprag is so connected to the housing, the sprag is effective in securing the sun gear connected to the sprag against rotation, and the power output from the converter is received by the transmission output shaft at the gear reduction ratio associated with "second" gear.

A third such clutch arrangement is employed to lock the pinions of the adjacent planetary gear set together so that they act as wedges to allow the two adjacent planetary gear sets to rotate as one unit. In this arrangement the power output from the converter is received by the transmission output shaft in what is designated as "third" gear.

Actuation of the first and third described clutch arrangements is generally effected when the operator selects the "reverse" range of operation.

Piston return springs are required and customarily employed to force the piston back into it's bore after piston apply pressure has been removed. These springs are usually located around the periphery of the clutch pack and react against either the piston or the first reaction plate to push the piston back. Inasmuch as these springs are on the same side as the clutch plates, they are located radially either inside or outside of the cylindrical area taken up by the clutch plates.

When the piston is applied, there is a bending moment generated between the piston apply force and the spring return force. This is because the springs are not located in the center of the piston. This bending moment causes deformation of the piston or the first reaction plate, resulting in non-uniform loading of the friction plates.

This uneven radial loading on the friction plates results in uneven unit and thermal loading, thereby causing friction material of bonding failure to occur earlier than what would occur if the loading were uniform.

DISCLOSURE OF THE INVENTION

It is, therefore, a primary object of the present invention to provide a return spring for actuating pistons employed in torque transmitting devices.

It is another object of the present invention to provide a return spring for actuating pistons having a self-adjusting clearance feature.

It is a further object of the present invention to provide a return spring for actuating pistons, as above, which can be placed directly behind the piston to achieve a uniform loading and improve friction plate durability.

It is still another object of the present invention to provide a return spring for actuating pistons, as above, which provides for a more uniform piston fill time and more consistent shifting.

It is yet another object of the present invention to provide a return spring for actuating pistons, as above, which permits self-adjusting as the friction plates wear.

It is yet a further important object of the present invention to provide a return spring for actuating pistons, as above, which can be readily assembled and changed.

It is a still further object of the present invention to provide a compression spring.

These and other objects of the invention, as well as the advantages thereof over existing and prior art forms, which will be apparent in view of the following detailed specification, are accomplished by means hereinafter described and claimed.

In general, a return spring embodying the concepts of the present invention is operable with a piston for use in fluid operated friction torque transmission devices. Such devices include relatively rotatable members carrying a plurality of torque plates, one of which provides a fluid chamber in which the piston is reciprocable. The return spring comprises flexible base means carried within a recess provided in one rotatable member, and, spring tab means extending from the flexible base means and engageable with the piston. The tab means is movable with the piston upon movement thereof in and out of the chamber in response to activation of the piston.

The return spring further comprises at least one leg means extending from the spring tab means, away from the internal cavity of the piston and communicable with the base of the fluid chamber. The leg means maintains a fixed clearance between the face of the piston and a torque plate within the rotatable member.

Exemplary embodiments of a return spring for an actuating piston assembly particularly adapted for use in conjunction with a torque transmitting system and deemed sufficient to effect a full disclosure of the subject invention are shown by way of example in the accompanying drawings and are described in detail without attempting to show all of the various forms and modifications in which the invention might be embodied; the invention being measured by the appended claims and not by the details of the specification.

BEST MODE FOR CARRYING OUT THE INVENTION

Figure 1:
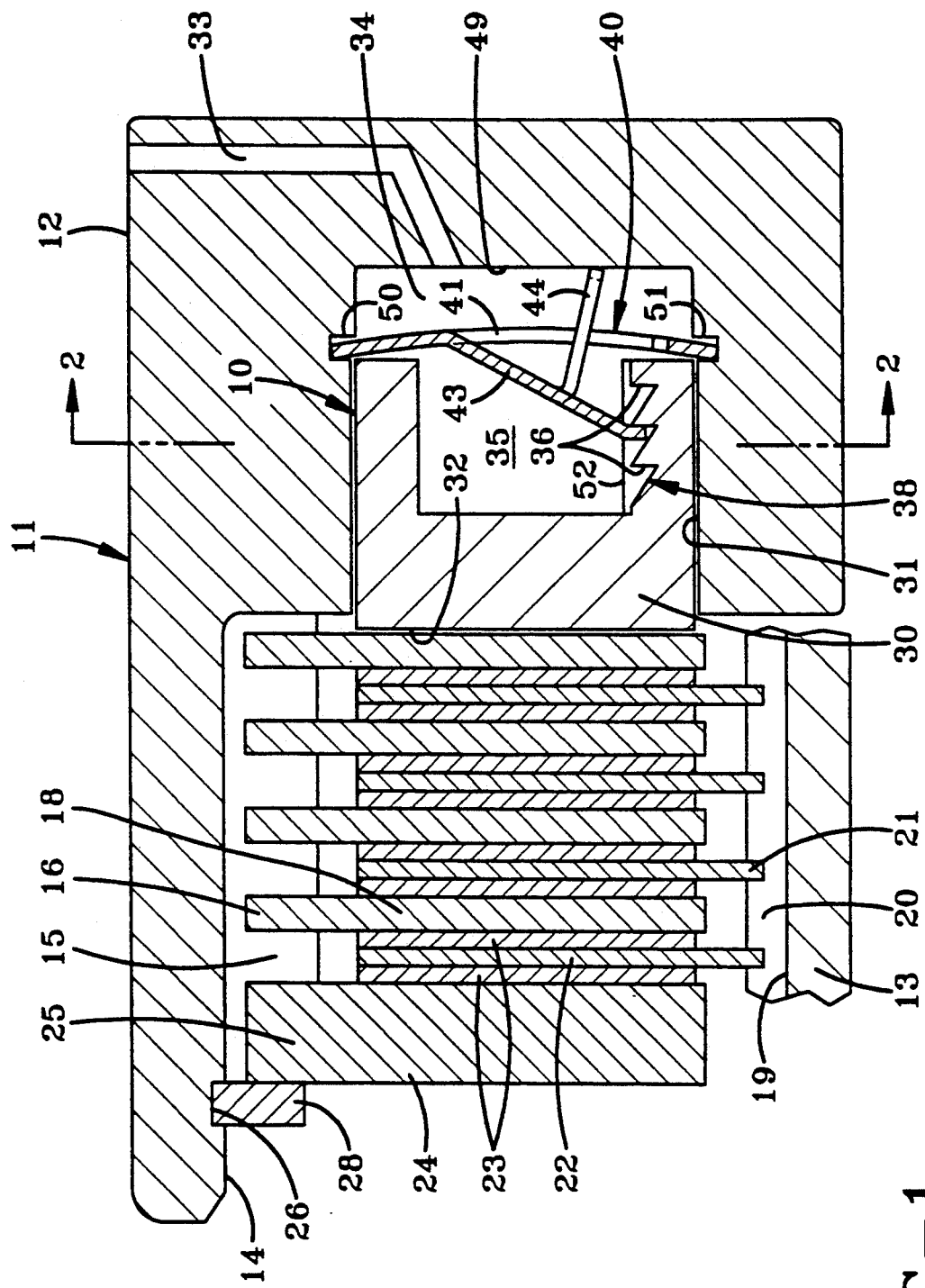
FIG. 1 is a cross section through a torque transmitting system which depicts an actuating piston assembly and including a return spring embodying the concepts of the present invention.

One representative form of an actuating piston assembly for a torque transmitting system embodying the concepts of the present invention is designated generally by the numeral 10 on the accompanying drawings.

To facilitate the disclosure of the present invention as well the actuating piston assembly 10 will first be described in conjunction with a fluid operated friction torque transmission device 11 in the nature of a vehicular transmission. As such, the torque transmitting device 11 is interposed between two relatively rotatable members 12 and 13. The member 12 may, for example, comprise an outer housing which may either be rotatable or fixed. The member 13 may comprise an inner hub which is generally rotatable. Whereas at least one of the members 12 or 13 is rotatable, it must be understood that the other member 13 or 12 may be either rotatable or fixed. That is, the actuating piston assembly 10 may be employed either in conjunction with a clutch mechanism or a brake mechanism.

In the example depicted, the radially inner surface 14 of the housing member 12 may be axially slotted, as at 15, to receive the tangs 16 of a plurality of first, annular torque plates 18 and thereby assure that the first torque plates 18 are not relatively rotatable with respect to the housing member 12, irrespective of whether the housing member 12 is itself rotatable or fixed. To assure that the interaction between the housing member 12 and the tangs is sufficient to withstand the loading to which the tangs will be subjected, a plurality of slots 15 are employed at circumferentially spaced intervals about the inner surface 14, and each of the first torque plates 18 are provided with a sufficient number of tangs 16 to interact with those slots 15, as is well known to the art.

Similarly, the radially outer surface 19 of the hub member 13 may also be axially slotted, as at 20 at circumferentially spaced intervals about the outer surface 19 to receive the several tangs 21 which extend radially inwardly from each of the plurality of second, annular torque plates 22 and thereby assure that the second torque plates 22 will not rotate relative to the hub member 13, as is also well known to the art.

An annular friction disk 23 is interposed between each successive first and second torque plate 18 and 22. To ensure that the several friction disks 23 will not be displaced when they are not compressed between the successive first and second torque plates 18 and 22 each friction disk 23 is preferably secured to one of the torque plates 18 and 22 between which it is sandwiched.

As is well known to the art, the friction disks 23 may be bonded to either the first or second torque plates 18 or 22 by a suitable adhesive.

An annular backing plate 24 is also preferably provided with a plurality of tangs 25 which extend radially outwardly therefrom to be received within the axial slots 15 in the housing member 12. A recess 26 is incised circumferentially within the radially inner surface 14 of the housing member 12 to receive a C-ring 28 or the like, to preclude axial displacement of the backing plate 24 away from the first and second torque plates 18 and 22 respectively, as will hereinafter be more fully discussed.

Figure 2:
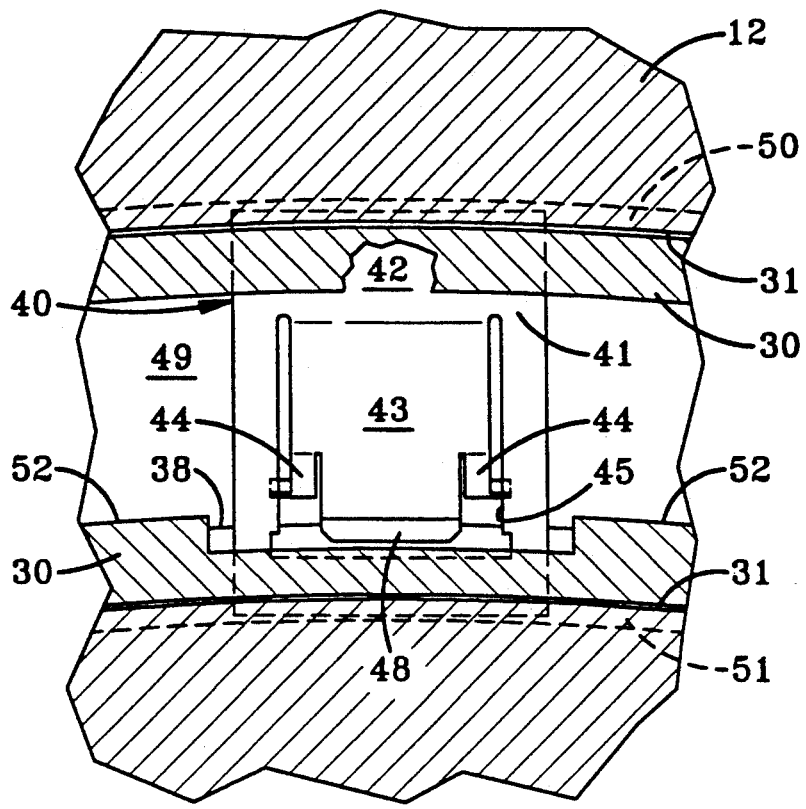
FIG. 2 is a top plan view of the novel piston return spring depicted in FIG. 1.

The self-adjusting piston return springs of the present invention will be described next with reference first to FIGS. 2-4. The actuating piston assembly 10 includes an annular piston 30, having a U-shaped cross section, which fits within annular piston bore 31. While the piston 30 and bore 31 are annular, it is to be understood that the piston return spring of the present invention could also be employed with individual pistons. The face 32 of piston 30 is directly engageable with the torque transmission device 11 via a pressure plate (not shown) or first torque plate 18 in response to hydraulic fluid activation provided via channel 33, into chamber 34, as is well known in the art. Inside of the piston 30 is a hollow cavity 35 which carries a plurality of saw-tooth notches 36, arranged in an axial channel 38, which are engageable with a portion of the self-adjusting spring of the present invention, indicated by the numeral 40. When the first and second series of torque plates 18 and 22 are thus firmly sandwiched between the backing plate 24 and piston face 32 respectively, the friction plates 23 preclude relative rotation between the torque plates 18 and 22 such that relative rotation between the housing member 12 and the hub member 13 is thereby also precluded.

Figure 3:
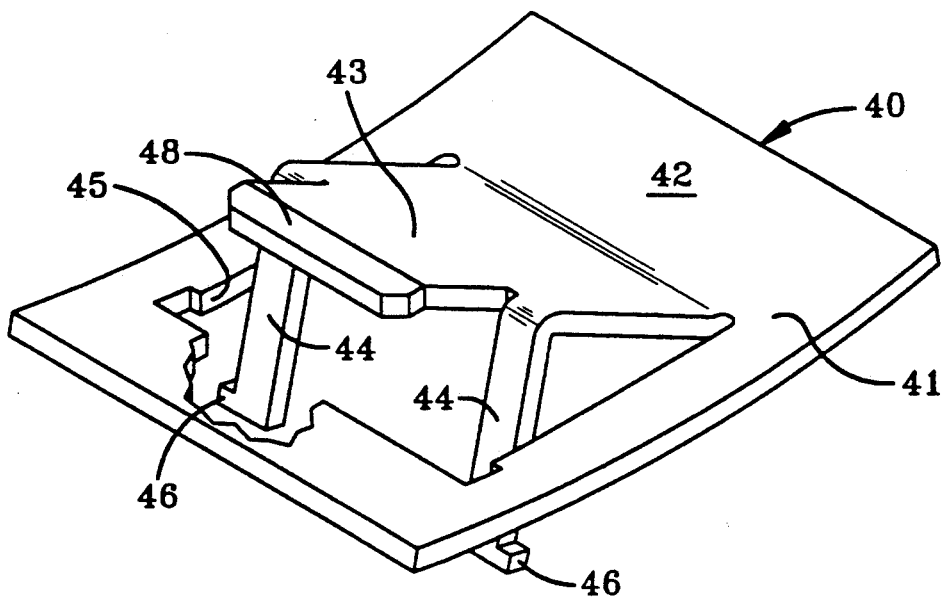
FIG. 3 is a perspective view of the novel piston return spring depicted in FIG. 1.

As most clearly depicted in FIG. 3, the spring 40 comprises an arcuate base 41 and is preferably formed from a sheet of spring steel or similar material. The base 41 is preferably arcuate to encourage flexing during assembly and discourage incorrect assembly. Because the spring 40 is generally pressed from a flat sheet, the base 41 may be flat if desired. Extending upwardly from the concave surface 42 thereof, is a spring tab 43, which carries a pair of legs 44 at either side that extend downwardly. The spring can be manufactured from one piece of steel by cutting or stamping an opening 45. The tab pawl 43 is bent upwardly, while the legs 44 are cut or stamped therefrom and bent downwardly, through the opening 45. Each leg 44 terminates with an outwardly extending foot 46. The tab 43 terminates in a flange 48 which engages one of the saw-tooth notches 36.

Where the piston 30 is annular, so is the chamber 34 within rotatable member 12. In this embodiment, a plurality of piston return springs 40 are located within the chamber 34 at equally spaced intervals, one such spring 40 being depicted in FIG. 3, wherein the piston has been removed for clarity. The present invention positions the return springs 40 inside of the piston cavity 35, directly between the piston 30 and the base 49 of chamber 34.

The spring base 41 is received within upper and lower recesses 50, 51 provided within the I.D. of chamber 34. The spring base 41 exerts a force in the recesses 50, 51 to prevent migration of the spring 40 during rotation of the piston at assembly. To assemble the piston return springs 40, three steps are required. First, the spring bases 41 are installed in the recesses 50, 51.

Next, the piston 30 is placed within the chamber 34 such that the flanges 48 abut a smooth surface 52 between circumferentially adjacent channels 38. Finally, the piston 30 is seated against the base 41 of spring 40 and is rotated until a notch 36 engages the flange 48, thereby locking the piston 30 to the spring 40. The piston 30 can be released from the springs 40 by continued rotation until the flange 48 is released from notches 36.

During operation, the piston is driven upon activation against the reaction plates 18 and 22, driving them together so that members 12 and 13 are locked together for unitary movement. Piston movement out of the chamber 34 tends to strengthen the base 41 of spring 40, thereby biasing it. Upon removal of the piston apply force, the spring base 41 relaxes causing it to return to its resting, concave state. Simultaneously, the flange 48 is retracted drawing the piston 30 back into the chamber 34 and disengaging the members 12 and 13.

A second feature of the spring 40 is to provide the self-adjustment of the piston 30 as the friction plates 23 wear. During use, wearing of the plates 23 will require additional piston travel for complete compression and engagement. Upon relaxation, the piston would otherwise retract to its original resting position, the result being greater subsequent piston travel, increased piston apply time and a loss of smooth, consistent shifting via the locking of members 12 and 13 together.

However, when this occurs and piston travel becomes excessive, the spring tab 43 abuts base 41, causing the flange 48 to snap into the next lower notch 36 which maintains the piston more out of the chamber 34 at rest and adjacent the first torque plate 18. Also during rest, the second set of legs 44 from spring 40 controls the rearwardmost movement of the piston into the chamber 34, as the feet 46 come to rest against base 49. As should be appreciated, the length and angle of legs 44 provide and control a pre-set gap for the distance of piston travel and duration before the torque and friction plated come together.

Figure 4:
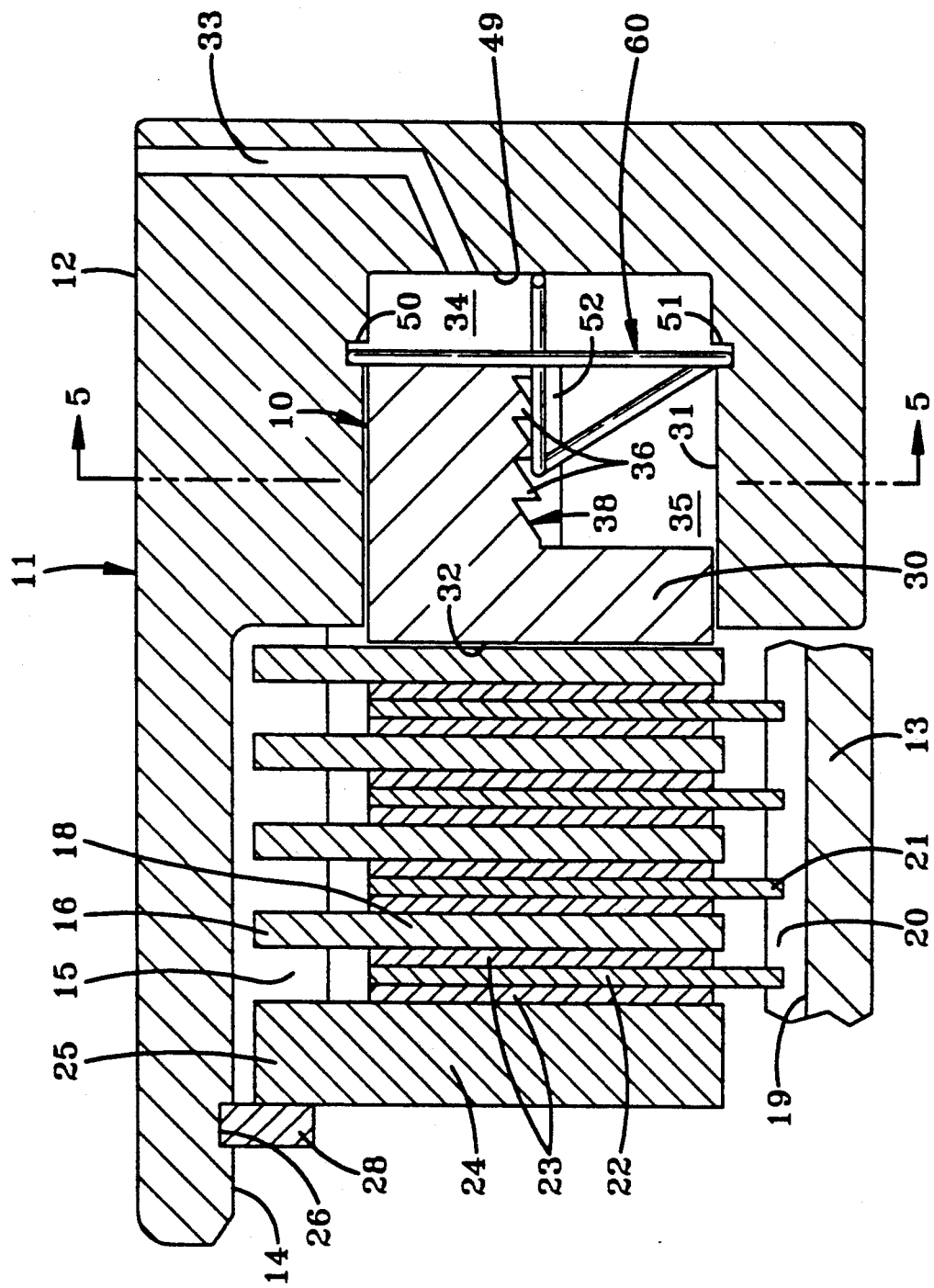
FIG. 4 is view similar to FIG. 1 which depicts an actuating piston assembly and alternative return spring also embodying the concepts of the present invention.
Figure 5:
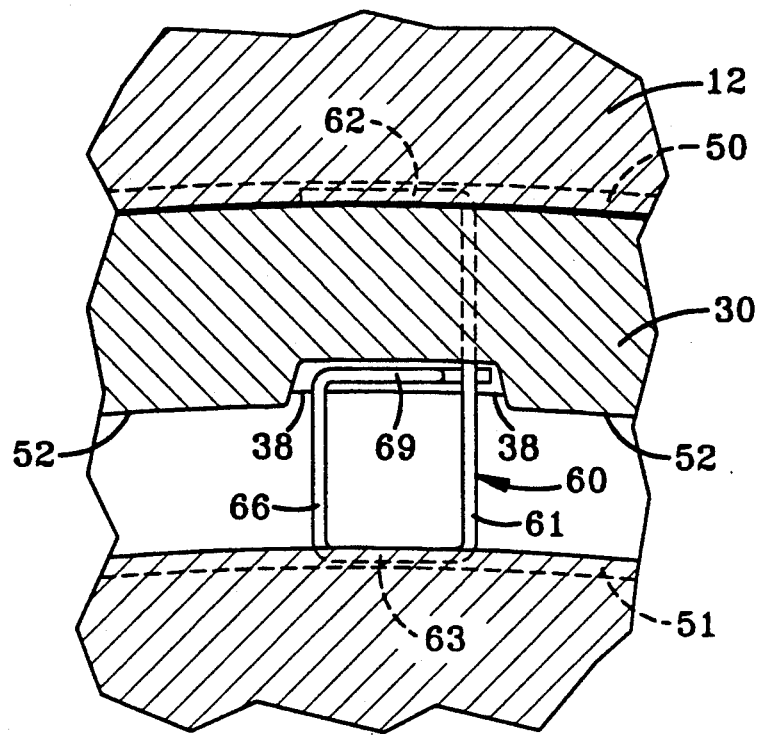
FIG. 5 is a top plan view of the novel piston return spring depicted in FIG. 4.
Figure 6:
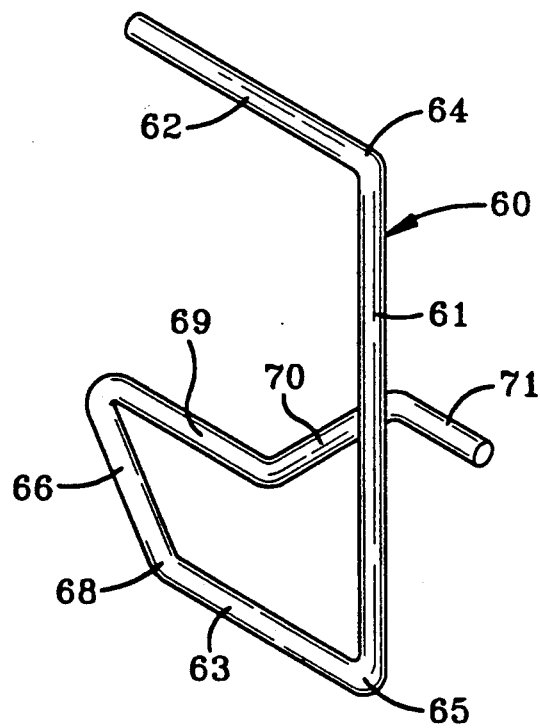
FIG. 6 is a perspective view of the novel piston return spring depicted in FIG. 4.

With reference to FIGS. 4-6, an alternative self-adjusting return spring according to the present invention will be describer next. In FIG. 4, torque transmission assembly is essentially the same, with the reference numerals of FIG. 1 applying to the same or similar elements.

The spring of this embodiment is indicated generally by the numeral 60 and is preferably formed from spring wire. Spring 60 comprises an elongate base member 61, providing ends 62, 63 engageable with recesses 50, 51 respectively, within chamber 34. As depicted in FIG. 6, the upper end 62 is simply formed by providing a right angle bend 64 in base member 61, while the lower end 63 is formed by providing another right angle bend 65 in approximately the mid-section of base 61.

A spring tab 66 is formed by bending the spring upwardly from lower end 63 the members 63 and 66 forming an acute angle at 68. A flange portion 69 is next formed perpendicular to tab 66 for engagement with the notches 36 of an axial channel 38 within piston cavity 35. A leg 70 is formed, extending rearwardly from flange portion 69 behind base member 61, and finally terminates in a foot 71.

The spring 60 is assembled in the same fashion as the spring 40. First, the ends 62 and 63 are positioned within recesses 50 and 51. Next, the piston 30 is placed within the chamber 34 and is then (seated against the base member) rotated until a notch 36 engages the flange 69 of spring tab 66. Piston release is facilitated as before, by counter-rotation.

Based upon the foregoing disclosure, it should now be apparent that the present invention carries out the objects set forth hereinabove. The present invention provides two embodiments of return springs that can be employed with actuating pistons which are annular, within an annular chamber. The return springs also provide a self-adjusting clearance feature which compensates for wear of friction plate members against which the actuating piston moves.

As should also be apparent, the return springs of the present invention can also be readily changed for replacement purposes or to vary the degree of return force by substituting a stronger spring or by adding additional springs. The return springs can also be adapted for use in individual, cylindrical pistons. The springs 40 and 60 are shown as individual components, however, they can be joined by interconnecting tabs to form a single member and thereby facilitate storage and assembly if desired without interfering with the spring function provided by the single members.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

What is claimed is:

1. A return spring operable with piston means for use in fluid operated friction torque transmission devices including relatively rotatable members carrying a plurality of torque plates, the piston means having an internal cavity, one of the members providing a fluid chamber in which the piston means is reciprocable, said fluid chamber having a base, the return spring comprising:

flexible base 41 means carried within recesses 50, 51 provided in the rotatable member;

spring tab 43 means extending from said flexible base means and engageable with a wall of the piston means; said tab means being movable with the piston means upon movement thereof in and out of said chamber in response to activation of the piston means; and at least one leg means extending from said spring tab means away from said internal cavity and communicable with said chamber base, said leg means maintaining a fixed clearance between the face of the piston means and a torque plate within the rotatable member.

2. A return spring, as set forth in claim 1, wherein said flexible base means comprises spring steel; said spring tab means being formed from said base means and defining an opening therein; said leg means extending through said opening, and said tab means and said flexible base means being relatively compressible to each other.

3. A return spring, as set forth in claim 1, wherein said flexible base means comprises spring wire, said tab means and said flexible base means being relatively compressible to each other.

4. A return spring operable with piston means having a hollow internal cavity, for use in fluid operated friction torque transmission devices including relatively rotatable members carrying a plurality of torque plates, one of the members providing a fluid chamber in which the piston means is reciprocable, the return spring comprising:

flexible base means carried within a recess provided in the fluid chamber of the rotatable member, said fluid chamber having a base; and spring tab means extending from said flexible base means and engageable with a wall of the internal cavity, said wall carrying a plurality of notches selectively engageable by said tab means; said tab means being movable with the piston means upon movement thereof out of said chamber in response to activation of the piston means, whereby said flexible base means is biased with respect to the piston means, causing the return of the piston means into said chamber upon removal of the force activating the piston means.

5. A return spring, as set forth in claim 4, further comprising:

at least one leg means extending from said spring tab means away from said internal cavity and communicable with said chamber base, said leg means maintaining a fixed clearance between the face of the piston means and a torque plate within the rotatable member.

6. A return spring, as set forth in claim 4, wherein said flexible base means comprises spring steel; said spring tab means being formed from said base means and defining an opening therein; said leg means extending through said opening, and said tab means and said flexible base means being relatively compressible to each other.

7. A return spring, as set forth in claim 4, wherein said flexible base means comprises spring wire, said tab means and said flexible base means being relatively compressible to each other.

8. A return spring operable with piston means having a hollow internal cavity, for use in fluid operated friction torque transmission devices including first and second relatively rotatable members carrying a plurality of torque plates, the first member providing a fluid chamber in which the piston means is reciprocable, the return spring comprising:

flexible base means carried within a recess provided in the fluid chamber of the first rotatable member, said fluid chamber having a base;

spring tab means extending from said flexible base means and engageable with a wall of the internal cavity, said wall carrying a plurality of notches selectively engageable by said tab means; and leg means extending from said spring tab means away from said internal cavity and providing an end resting upon said chamber base, said leg means maintaining a fixed clearance between the face of the piston means and a torque plate within the first rotatable member, said tab means being movable with the piston means upon movement thereof out of said chamber in response to activation of the piston means, whereby said flexible base means is biased with respect to the piston means, causing the return of the piston means into said chamber upon removal of the force activating the piston means.

9. A return spring, as set forth in claim 8, wherein said flexible base means comprises spring steel; said spring tab means being formed from said base means and defining an opening therein; said leg means extending through said opening, and said tab means and said flexible base means being relatively compressible to each other.

10. A return spring, as set forth in claim 8, wherein said flexible base means comprises spring wire, said tab means and said flexible base means being relatively compressible to each other.

11. A compression spring comprising:
flexible base means;
spring tab means extending from said flexible base means, said spring tab means being formed from said base means and defining an opening therein; and
at least one leg means extending from said spring tab means and through said opening, said tab means and said flexible base means being relatively compressible to each other.

* * * * *